INVENTOR
Walter Wildner

INVENTOR

Walter Wildner

United States Patent Office 3,441,220
Patented Apr. 29, 1969

3,441,220
EXHAUST GAS DEFLECTING PIPE
Walter Wildner, Munich-Pasing, Germany, assignor to M.A.N. Turbo GmbH, Munich-Allach, Germany
Filed Mar. 2, 1967, Ser. No. 620,149
Claims priority, application Germany, Mar. 3, 1966,
M 68,614
Int. Cl. B64c 15/04; B05b 15/08
U.S. Cl. 239—265.35                                    8 Claims

ABSTRACT OF THE DISCLOSURE

Exhaust pipe sections are connected together by differential gears so that the sections can be driven to rotate relative to each other.

---

This invention is for a means for actuating a thrust deflector consisting of three pipe sections that can be rotated about their longitudinal axes relative to each other, which serves to deflect the engine exhaust gases from the direction parallel to the engine longitudinal axis, preferably, to obtain a thrust component normal to the engine longitudinal axis, with the first and third pipe section being rotatable together with the same circumferential speed and in the same direction, while, at the same time, the second one, i.e. the center section, rotates in the opposite direction relative to the other two sections, with the opposing circular faces of the pipe sections at an inclined position.

Swiss Patent No. 327,871 discloses a thrust deflector of this type; in this case, however, the actuating mechanism and supporting elements for the individual pipe sections are rather complicated and costly and require much space in the circumferential direction of the thrust deflector.

The present invention eliminates the disadvantages of the above-mentioned known arrangement by keeping the first and second rotatable pipe sections in engagement, i.e. through a common differential gearing in the circumferential direction of the oblique outlet of the first pipe section and the corresponding inlet of the second pipe section, and the second and third pipe section through another differential gearing in the circumferential direction of the oblique outlet of the second section and the corresponding inlet of the third pipe section, and by positively coupling the external pipe sections so that the first pipe section transfers its rotational movement to the third pipe section.

According to this invention, the gear teeth at the ends of a telescope type Cardan shaft are in engagement with the differential ring gears of the outer pipe sections.

By means of the arrangement as covered by this invention, the third rotatable pipe section, which only requires little torque, is driven through the differential gearing and the Cardan shaft, whereas the first and second rotatable pipe section, subject to a considerably greater torque, are directly driven through the relevant gear teeth.

The arrangement, as covered by the invention, is of simple and robust construction as compared with the Swiss patent arrangement for effecting a rotational motion of several pipe sections of a thrust deflection unit and, moreover, it requires little space which is above all desirable in V/STOL aircraft. The arrangement as covered by this invention combined with the special design of the thrust deflector is preferably suited for installation into the fuselage aft section of the aircraft, since it is, above all, in this area that little room is available.

A further embodiment of this invention includes a first bearing ring carrying the differential gear mounted on the stationary jet pipe section through a bow type bracket which is arranged, completely or partly, at a right angle to the oblique plane of the outlet of the first rotatable pipe section, with the bearing ring located adjustable in an elongated hole of the bracket and fixed by means of a fastener to compensate its swash.

Finally, said invention provides for the backet to be preferably arranged at an angle of 45° relative to the vertical medium plane of the stationary jet pipe and mounted to a bottom side of its external wall so that the basically shorter section of the outer side wall, resulting from the oblique section of the outlet of the first rotatable pipe section, is rotated clear of the bow-type bracket. This bracket is the only supporting element for the direct connection between the stationary jet pipe section and the first bearing ring; due to its favorable arrangement it requires only little space at the circumference of the jet deflector.

Rotating the three pipe sections relative to each other, e.g. to obtain a vertical thrust component, results in an axial swash movement of the bearing rings carrying the differential gearing. According to this invention, the swash movement is taken up by the telescope type Cardan shaft which is preferably so arranged between the differential gearing on one side of the rotatable center pipe section that the basically longer section of the inlet and outlet opening of the rotatable center pipe section is rotated past the Cardan shaft.

Thus, a minimum change in length of the Cardan shaft is ensured.

Furthermore, the effectivenes of this invention is assisted by the fact that the bearing rings and the Cardan shaft connected to it do not rotate in the circumferential direction of the pipe sections, when these are rotated relative to each other. Thus, independent of the deflector position the Cardan shaft is always parallel to the longitudnial axis of the center pipe section in a spatially favorable range of the top half of its outer wall, and it is only pushed together or extended due to the axial swash of the bearing rings. The Cardan shaft is simultaneously a driving, retaining and synchronizing element of the differential gearing located between the center and the last pipe section.

To ensure a spatially favorable arrangement of the thrust deflector, it is also proposed to arrange the drive motor effecting the rotary movement of the individual pipe sections preferably at an angle of 45° relative to the vertical medium plane of the stationary jet pipe section and mount it to its outer wall.

This invention provides for a favorable arrangement of all deflector drive components around the circumference of the stationary jet pipe and the pipe sections, both regarding space requirements and design, in order to obtain minimum fuselage cross-section. Minimum distance between two jet engines is, above all, ensured when two or more jet engines are installed parallel to each other combined with two or more arrangements as provided by this invention.

An investigation into the design of the thrust deflector shows that, with the deflector in the deflected position, the thrust component will apply to the rotatable center pipe section a torque due to geometric reasons. This torque requires the major portion of the drive output and, as provided by this invention, it becomes blocked by a brake fitted to the drive as soon as the desired final position of the deflector is reached.

The means by which the objects of this invention are obtained are disclosed more fully with reference to the accompanying schematic drawings in which.

Figure 1:
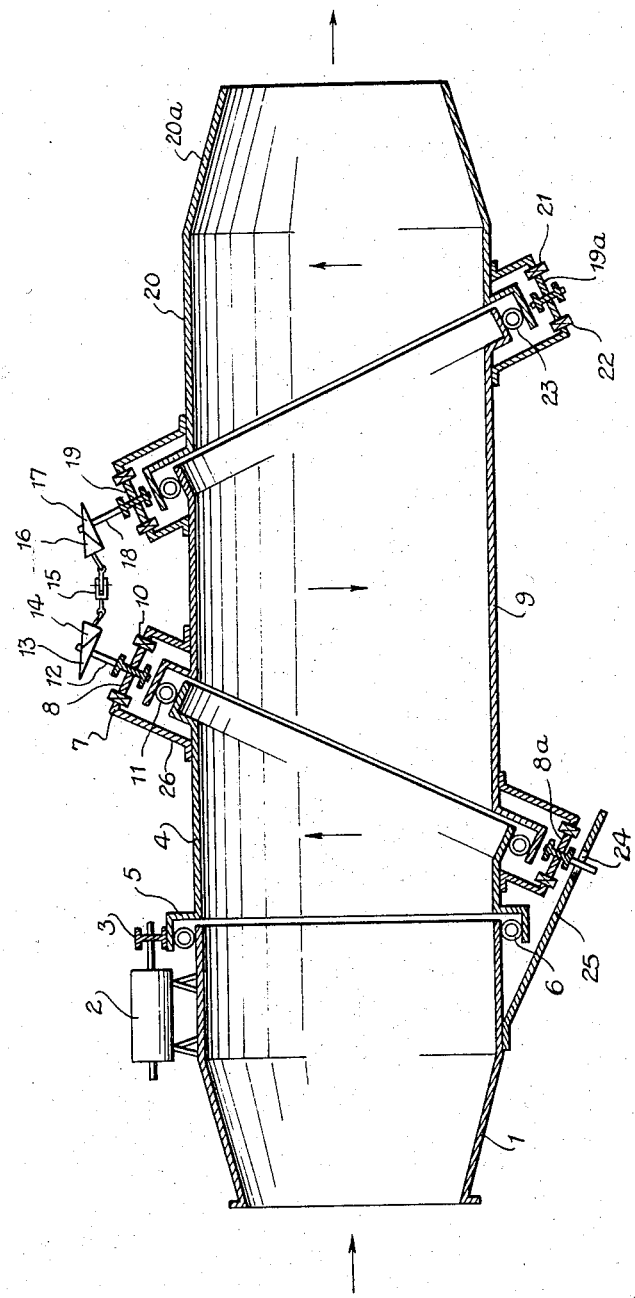
FIGURE 1 is a longitudinal cross-sectional view through the thrust deflector.

In FIGURE 1, the whole thrust deflector actuating system has been shown in a horizontal plane for greater simplicity; in this case, the thrust deflector is in the horizontal flight position. A first jet pipe 1 is rigidly fitted to the end of a turbo-jet engine not shown in this figure. On one side of the stationary jet pipe 1, a drive motor 2 is located, e.g. an air motor, with its pinion 3 in engagement with a ring gear 5 around the circumference of the inlet opening of the first rotatable pipe section 4, for rotating pipe section 4 in one direction; this section is connected to jet pipe 1 by a bearing 6 provided around its inlet opening. The oblique outlet end of pipe section 4 is also provided with a ring gear 7 (FIG. 2) in the direction of its circumference in engagement with the gears 8 which, in turn, are in engagement with another ring gear 10 in the circumferential direction of the inlet of the second rotatable pipe section 9, thus rotating pipe section 9 connected to section 4 through a bearing in the opposite direction of section 4.

On the extended shaft 12 of a gear 8, a bevel gear 13 is rigidly mounted which is rotated accordingly when the gear 8 rotates. The gear 13 together with a mating bevel gear 14 forms an angle drive. The bevel gear 14 is fitted to one end of a Cardan shaft 15 (FIG. 1) fitted with a universal joint; the other similar end of the shaft carrying a bevel gear 16 equipped with a universal joint. This bevel gear 16 together with a mating bevel gear 17, in turn, forms an angle drive. The bevel gear 17 is rigidly fitted to the one end of a shaft 18 carrying, at its other end, a gear wheel 19 in engagement with a ring gear 21 in the direction of the circumference of the oblique inlet opening of the third rotatable pipe section 20 and with a ring gear 22 in the direction of the circumference of the outlet opening of pipe section 9. Between pipe section 9, 20 a bearing 23 in the direction of the circumference of the outlet opening of pipe section 9 is provided. Thus, pipe section 4 drives the pipe section 20 via the gear 7, 8, 8a, 13, 14 and the Cardan shaft 15 and the gear 16, 17, 19, 21 connected to it. The gear 19a opposite gear 19 on the other side of the pipe sections 9, 20 serves only to assist in the rolling motion of the mating gears 21, 22.

The mating gear 8a opposite gear 8 on the other side of the pipe sections 4, 9 serves to assist in producing a rotational movement of pipe section 9 opposite the movement of pipe section 4, with its shaft guided in the elongated hole 24 of a bow-type bracket 25 mounted to the jet pipe 1 on the side opposite the motor 2. At the end of the pipe section 20, a thrust nozzle 20a of variable section is provided. The arrows within pipe section 4, 9 and 20e indicate their direction of rotation.

Figure 2:
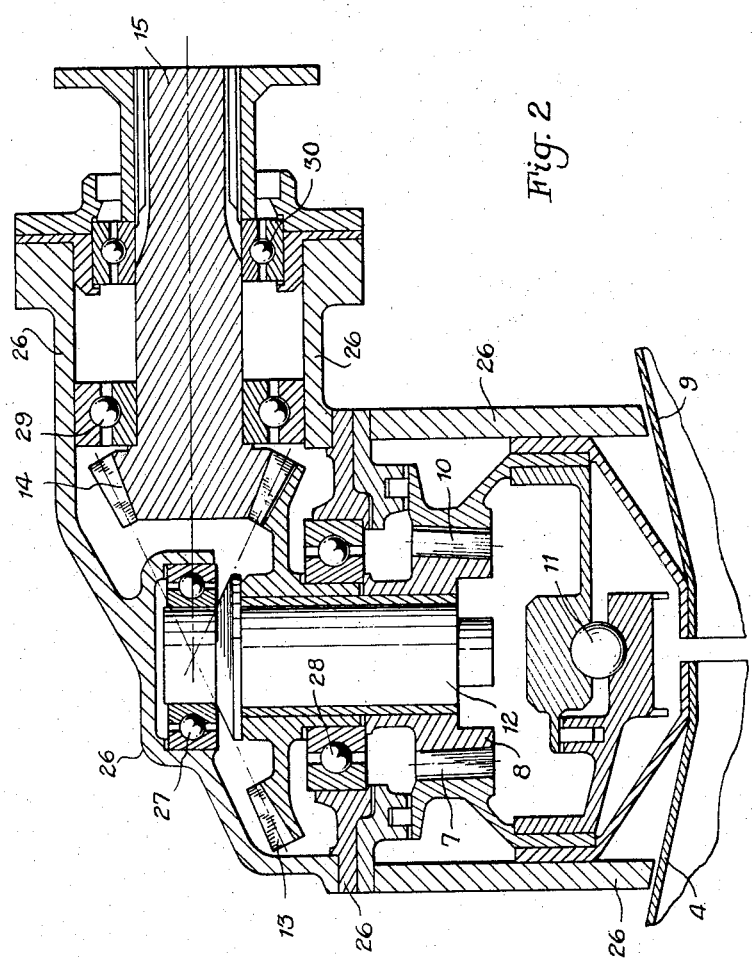
FIGURE 2 is a cross-sectional view through the drive connection between the first and second pipe sections.

Details of the differential gearing comprising 7, 8, 10, 12, 13, 14 are shown enlarged in FIG. 2. The bearing ring supporting part 26 is of the drive mechanism. The upper end of the shaft 12 carrying gear 8, 13 is supported by a ball bearing 27, sidewise pressure being taken up by the bearing ring 26. During operation of the thrust deflector, the shaft 12 is subjected to an axial downward thrust component which, however, remains without effect, since the bevel gear 13 rotates in a bearing 28 and is supported by it.

Bearing 28 is also partly supported by the bearing ring 26. One end of the Cardan shaft 15, with bevel gear 14, is also supported in ball bearings 29, 30 which again are supported by part of the bearing ring 26. One end of the Cardan shaft 15, with bevel gear 14, also rotates in ball bearings 29, 30 supported by part of the bearing ring 26. A bearing ring 26a similar to ring 26, FIGS. 3 and 4, is provided around the outlet end of pipe section 9 and the inlet end of pipe section 20 and supports the gear 16, 17, 19, 19a, 21, 22 (FIG. 1).

Figure 3:
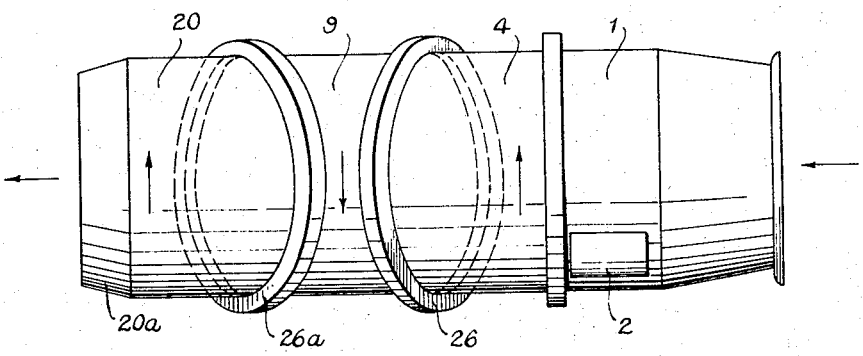
FIGURE 3 is a side view of the thrust deflector.

FIGS. 3, 4, 5, 6 show different views of the same thrust deflector with its actuating mechanism for effecting the rotational movement of the pipe sections; in the following description of these figures, the same numbers as in FIGS. 1 and 2 were used. FIG. 3 shows the thrust deflector in its extended final position for horizontal flight. In this case, the drive motor 2 effecting the rotational movement is in the desired position and fitted to the external wall of the jet pipe 1 (FIG. 6) on the bottom half at an angle of 45° relative to the vertical medium plane.

Figure 4:
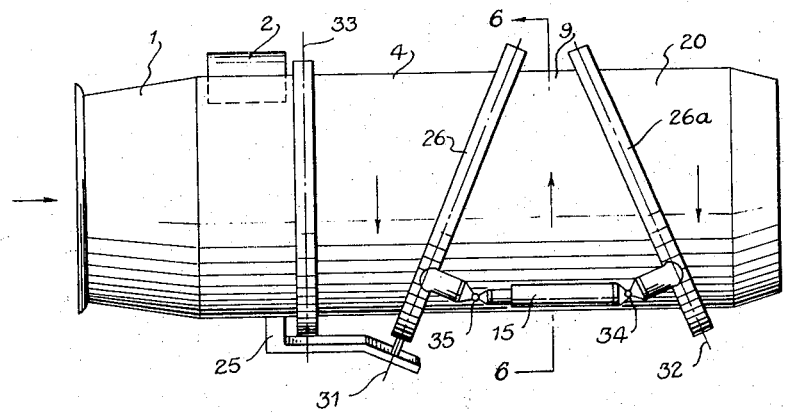
FIGURE 4 is a top view of the thrust deflector.

FIG. 4 shows the configuration of the two oblique sectional planes 31, 32 between the pipe sections 4, 9 and 20. In this view, the planes 31, 32 are inclined relative to the straight sectional plane 33 at an angle of 22½° formed by the one outlet end of the jet pipe 1 and the inlet end of pipe section 4. The absolute angle of rotation of each pipe section 4, 9 and 20 is approximately 90° maximum and depends upon the required swivelling angle of the thrust deflector, which is also 90° approximately.

Figure 6:
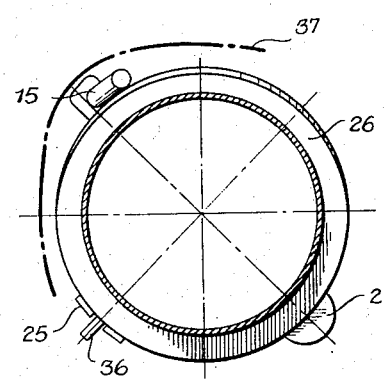
FIGURE 6 is a cross-sectional view taken on the line 6—6 in FIGURE 4.

The telescope type Cardan shaft 15 is always in its most favorable position at the side of the top half of pipe section 9 at an angle of approximately 45° relative to the vertical medium plane of pipe section 9 (FIG. 6). Universal joints 34, 35 are for connecting the telephone type section of the Cardan shaft 15 with its two ends, with one end fitted to bearing ring 26 and the other end to bearing ring 26a. Within each swivelling range of the deflectors, the bearing rings 26, 26a are always parallel to the sectional planes 31, 32.

Figure 5:
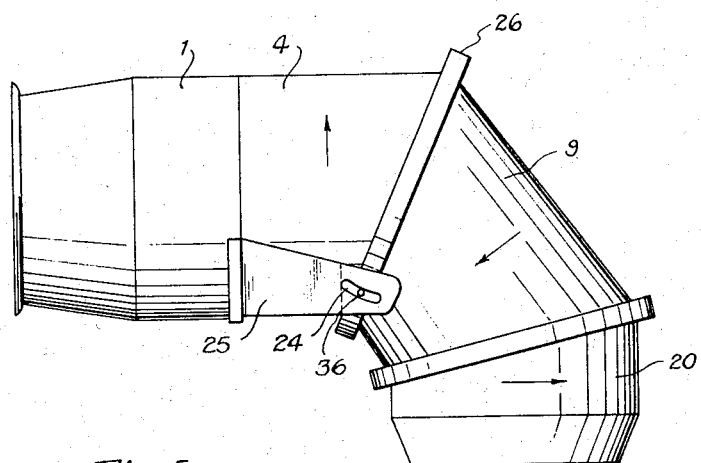
FIGURE 5 is a side view of the thrust deflector in a curved position.

FIG. 5 shows the thust deflector in an angular position for producing a vertical thrust component. From this the desired position of the bow-type bracket 25 can be seen, which is fitted at an angle of approximately 45° relative to the vertical medium plane of the stationary jet pipe section 1 to the bottom side of its outer side wall (FIG. 6). The bearing ring 26 is provided with a pin 36 which is guided in an elongated hole 24 in the bracket 25, thus being able to slide axially to compensate for its swash and to remain stationary in the circumferential direction.

FIG. 6 shows the exact location of motor 2, Cardan shaft 15 and bow-type bracket 25 at the circumference of the thrust deflector which, in this case, is in its extended position for horizontal flight. Due to the favorable arrangement of the elements 2, 15, 25, as concerns space requirements, that drive and support the pipe sections 4, 9 and 20, the fuselage configuration as shown by the broken line 37, can be so designed as to pass along the thrust deflector at a very close distance. Pipe sections 4, 9 and 20 are basically of slightly elliptical section so that the openings of pipe sections 4, 9 and 20, parallel to the sectional planes 31, 32, are of circular shape.

Having now described the means by which the objects of the invention are obtained, I claim:

1. An exhaust gas deflecting pipe comprising three pipe sections rotatable about their longitudinal axes relative to each other for deflecting engine exhaust gases from a direction parallel to the longitudinal engine axis to a directional normal to the engine axis for producing a vertical thrust, the first and third pipe sections being rotatable together at the same speed and in the same direction, and the second middle pipe section being rotated in the opposite direction, each pipe section having at least one end inclined with respect to the pipe section longitudinal axis, differential ring gear means connecting the first and second, and the second and third pipe sections, respectively, said ring gear means following the inclined ends of the pipe sections, drive means for driving said second pipe section directly by said first pipe section through said differential ring gear means, and drive coupling means directly coupling the first pipe section to the third pipe section for rotating the third pipe section by the rotational movement of said first pipe section.

2. A pipe as in claim 1, said drive coupling means including a telescopic Cardan shaft having a gear engaged with said ring gear means.

3. A pipe as in claim 2, further comprising a stationary pipe section, ring gear means comprising a bearing ring, bow-shaped bracket means for connecting said bearing ring to said stationary pipe section, said bracket means extending substantially at a right angle to the inclined end of the first pipe section, an elongated hole in said bracket means, and fastening means secured to said bearing ring and extending through said hole for compensating for the swash occurring during the rotation of said bearing ring.

4. A pipe as in claim 3, said bracket means comprising a bracket attached to the bottom side of said stationary section and extending at an angle of about 45° to the inclined end of said first pipe section and across the narrow bottom side of said first pipe section when said pipe sections are horizontally aligned.

5. A pipe as in claim 4, said telescopic Cardan shaft being coupled between the differential gear ring means for the first and second, and the second and third pipe sections, respectively, for further compensating for the swash of the bearing rings.

6. A pipe as in claim 5, said Cardan shaft being positioned on the narrow side of said second pipe section when the pipe sections are horizontally aligned so that the longer side of said second section is rotatable past said Cardan shaft.

7. A pipe as in claim 6, said bearing rings and Cardan shaft being non-rotatable in the circumferential direction of said pipe sections when said pipe sections are rotated relative to each other.

8. A pipe as in claim 7, further comprising drive motor means mounted on the external wall of said stationary pipe section for rotating said first pipe section, said motor means being displaced 45° from the vertical plane through said stationary pipe section.

References Cited

UNITED STATES PATENTS

| | | | |
|---|---|---|---|
| 2,886,626 | 5/1959 | Fletcher | 239—265.35 X |
| 2,933,891 | 4/1960 | Britt | 239—265.35 |
| 3,067,579 | 12/1962 | Olbrich | 244—23 X |

EVERETT W. KIRBY, *Primary Examiner.*

U.S. Cl. X.R.

239—587